US009542656B2

(12) United States Patent
Behnen et al.

(10) Patent No.: US 9,542,656 B2
(45) Date of Patent: Jan. 10, 2017

(54) SUPPORTING ETL PROCESSING IN BPEL-BASED PROCESSES

(75) Inventors: Marion Behnen, Austin, TX (US); Qi Jin, San Jose, CA (US); Yannick Saillet, Stuttgart (DE); Sriram Srinivasan, Sunnyvale, CA (US); Muthukumar Thirunavukkarasu, Mountain View, CA (US); Hoi J. Yoo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2175 days.

(21) Appl. No.: 11/559,402

(22) Filed: Nov. 13, 2006

(65) Prior Publication Data

US 2008/0115135 A1     May 15, 2008

(51) Int. Cl.
| | | |
|---|---|---|
| *G06Q 30/02* | (2012.01) | |
| *G06Q 10/10* | (2012.01) | |
| *G06Q 10/06* | (2012.01) | |
| *G06Q 30/06* | (2012.01) | |
| *G06Q 10/08* | (2012.01) | |
| *G06Q 10/00* | (2012.01) | |

(52) U.S. Cl.
CPC ............ *G06Q 10/00* (2013.01); *G06Q 10/103* (2013.01)

(58) Field of Classification Search
CPC .............................. G06Q 10/103; G06Q 10/00
USPC ................................................... 705/1.1–912
See application file for complete search history.

(56) References Cited

U.S. PATENT DOCUMENTS

| | | |
|---|---|---|
| 2003/0236690 A1 | 12/2003 | Johnston-Watt et al. |
| 2004/0249644 A1 | 12/2004 | Schiefer et al. |
| 2005/0187991 A1 | 8/2005 | Wilms et al. |
| 2005/0251527 A1 | 11/2005 | Phillips et al. |
| 2005/0262192 A1 | 11/2005 | Mamou et al. |
| 2006/0020948 A1 | 1/2006 | Carr et al. |
| 2006/0031750 A1 | 2/2006 | Waldorf et al. |
| 2006/0075391 A1 | 4/2006 | Esmonde, Jr. et al. |
| 2006/0095274 A1 | 5/2006 | Phillips et al. |
| 2006/0106626 A1 | 5/2006 | Jeng et al. |
| 2006/0112109 A1 | 5/2006 | Chowdhary et al. |

OTHER PUBLICATIONS

Mendling, Jan et al., "An Approach to Extract RBAC Models from BPEL4WS Processes", Proceedings of the 13th IEEE International Workshops on Enabling Technologies . . . , 2004.

(Continued)

*Primary Examiner* — Jonathan Ouellette
(74) *Attorney, Agent, or Firm* — Mollborn Patents, Inc.; Fredrik Mollborn

(57) ABSTRACT

Methods and apparatus, including computer program products, implementing and using techniques for integrating and data activities in a process flow. A data transformation activity is invoked through local or remote invocation. The data transformation activity is part of a process flow defined in a standard business process execution language format and is invoked from within the process flow. A system for executing a process flow including one or more control activities and one or more data transformation activities is also described. The system includes a process control engine for executing activities included in the process flow, a data transformation subsystem for storing domain specific definitions of data transformation processes of data in one or more databases, and a control data repository for storing domain specific activity information related to the process flow.

30 Claims, 9 Drawing Sheets

(56) References Cited

OTHER PUBLICATIONS

Karastoyanaova, Dimka et al., "Extending BPEL for Run Time Adaptability", Proceedings of the 2005 9th IEEE International EDOC Enterprise Computing Conference, 2005.
Andrews, Tony et al., "Business Process Execution Language for Web Services, version 1.1 dated May 5, 2003", BEA Systems et al., 2002,2003.
Blow, Michael et al., "BPELJ: BPEL for Java: A Joint White Paper by BEA and IBM", Mar. 2004, http://ftpna2.bea.com/pub/downloads/ws-bpelj.pdf.
"Java Community Process (SM) Program: JSRs: Java Specification Requests—Detail JSR . . . ", Sun Microsystems, Retrieved Oct. 31, 2006 from http://web1.jcp.org/en/jsr/detail?id=207.
Christensen, Erik et al., "Web Services Description Language (WSDL) 1.1.", Ariba, IBM, Microsoft, 2001, http://www.w3org/TR/wsdl.
"Information Integration for BPEL on WebSphere Process Server" Manual, IBM, Retrieved Oct. 31, 2006 from http://vvww.alphaworks.ibm.com/tech/ii4bpel.
"BPEL Project Milestone Plan", The Eclipse Foundation, Retrieved Oct. 31, 2006 from http://www.eclipse.org/bpel/developers/milestone_plan.php.
Openlink Virtuoso Universal Server: Documentation. Ch. 15.13 "BPEL Reference", Openlink Software, Retrieved Oct. 31, 2006 from http://docs.openlinksw.com/virtuoso/bpel.html.

Sample for WSDL interface

```xml
<?xml version="1.0" encoding="UTF-8"?>
<definitions targetNamespace="http://tempuri.org/services/etlclient"
    xmlns="http://schemas.xmlsoap.org/wsdl/"
    xmlns:bpws="http://schemas.xmlsoap.org/ws/2003/03/business-process/"
    xmlns:plnk="http://schemas.xmlsoap.org/ws/2003/05/partner-link/"
    xmlns:soap="http://schemas.xmlsoap.org/wsdl/soap/"
    xmlns:tns="http://tempuri.org/services/etlclient" xmlns:xsd="http://
www.w3.org/2001/XMLSchema">
    <message name="callClientRequest">
        <part name="in" type="xsd:string"/>
    </message>
    <message name="disResponse">
        <part name="result" type="xsd:string"/>
        <part name="errno" type="xsd:int"/>
        <part name="sqlstate" type="xsd:string"/>
        <part name="errmsg" type="xsd:string"/>
    </message>
    <portType name="ETLClient">
        <operation name="callClient">
            <input message="tns:callClientRequest"/>
            <output message="tns:callClientRequest"/>
        </operation>
    </portType>
</definitions>
```

FIG. 6

Sample for the client definition in the WSDL interface:

```
<?xml version="1.0" encoding="UTF-8"?>
<definitions name="ETLProcessInterface"
    targetNamespace="http://wsdl/ETLProcessInterface"
    xmlns="http://schemas.xmlsoap.org/wsdl/"
    xmlns:bpws="http://schemas.xmlsoap.org/ws/2003/03/business-process/"
    xmlns:plnk="http://schemas.xmlsoap.org/ws/2003/05/partner-link/"
    xmlns:tns="http://wsdl/ETLProcessInterface"
    xmlns:wsdl0="http://tempuri.org/services/etlclient"
xmlns:xsd="http://www.w3.org/2001/XMLSchema">
    <import location="../wsdl/ETLClient.wsdl" namespace="http://
tempuri.org/services/etlclient"/>
    <import location="ETLClient.wsdl" namespace="http://tempuri.org/
services/etlclient"/>
    <plnk:partnerLinkType name="ETLClientPLT">
        <plnk:role name="client">
            <plnk:portType name="wsdl0:ETLClient"/>
        </plnk:role>
    </plnk:partnerLinkType>
    <plnk:partnerLinkType name="ETLClientPLT">
        <plnk:role name="client">
            <plnk:portType name="wsdl0:ETLClient"/>
        </plnk:role>
    </plnk:partnerLinkType>
</definitions>
```

FIG. 7

Sample for BPEL-ETL activity definition: (based on BPEL4Java)

```
        <invoke name="Wait1" operation="null" partnerLink="null"
            portType="wpc:null" wpc:businessRelevant="yes"
            wpc:continueOnError="no" wpc:displayName="Wait1" wpc:id="8"
wpc:transactionalBehavior="requiresOwn">
            <wpc:script>
                <wpc:javaCode><![CDATA[/*
 * @filewait G:\test\filewait\wait.txt
 * @checkexistence true
 * @wait 0
 * @periodicity 1
 * @failureLink false
 */
try {
Class d =
Class.forName("com.ibm.datatools.etl.dis.was.run.RunActivityJS");
java.lang.reflect.Method m = d.getDeclaredMethod("startActivity",
        new Class[] { com.ibm.bpe.api.ProcessInstanceData.class,
                    com.ibm.bpe.api.ActivityInstanceData.class } );
String disResult [] = (String []) m.invoke(d.newInstance(), new Object[]
{ processInstance(), activityInstance() } );
getSystem_filewait_8(true).setResult(disResult[0]);
getSystem_filewait_8(true).setErrno(Integer.parseInt(disResult[1]));
getSystem_filewait_8(true).setSqlstate(disResult[2]);
getSystem_filewait_8(true).setErrmsg(disResult[3]);
if(Integer.parseInt(disResult[1]) != 0) {
        throw new RuntimeException(disResult[3]); }
} catch (Exception dex) {
  System.out.println(dex.getMessage());
  dex.printStackTrace();
  throw new RuntimeException(dex);
  }
]]></wpc:javaCode>
            </wpc:script>
            <target linkName="Link2"/>
            <source linkName="Link3"/>
        </invoke>
```

FIG. 8

Sample for variables definition
```
    <variables>
        <variable messageType="wsdl0:callClientRequest"
name="InputVariable"/>
        <variable messageType="wsdl0:disResponse"
name="System_filewait_8"/>
        <variable messageType="wsdl0:disResponse"
name="System_process_9"/>
    </variables>
```

FIG. 9

Sample excerpt for dataflow execution metadata:
```
    <codeUnit codeUnitType="READER" phase="RUNTIME">
       <code/>
       <ArgumentTable key="@FILE">
         <value name="@FILE">
           <value
xsi:type="com.ibm.datatools.etl.codeunit:CodeTemplate">
             <statementList>
               <elementList text="G:\programs\dwe\samples\data\sqw\
DWH_ITM_TXN_update_files.txt"/>
             </statementList>
           </value>
         </value>
       </ArgumentTable>
       <ArgumentTable key="@DELIMIT">
         <value name="@DELIMIT">
           <value
xsi:type="com.ibm.datatools.etl.codeunit:CodeTemplate">
             <statementList>
               <elementList text=","/>
             </statementList>
           </value>
         </value>
       </ArgumentTable>
```

FIG. 10

SUPPORTING ETL PROCESSING IN BPEL-BASED PROCESSES

BACKGROUND

This invention relates to data processing tools for assisting users in decision making processes. Data Warehousing is a tool used for providing users with information needed in various decision making processes, for example, in various types of businesses and other types of organizational environments. In order to provide current information, the data warehouse must be continuously updated and consolidated to properly reflect a current state of a business or organizational entity. Data from multiple sources is extracted, transformed and loaded into the data warehouse at various times in a process. Typically, the transformation steps are modeled as data flows, which can be implemented as SQL scripts, shell scripts, application programs, and other types of command execution. Frequently, in an enterprise, for a complete end-to-end solution, such data flow executions are also interspersed with other existing processes, for example, legacy or third party processes.

Businesses and organizations often rely on a service-oriented approach to support their processes. A programming language that is used in this service-oriented approach is BPEL4WS (Business Process Execution Language for Web Services). This standard language is supported by a variety of runtime engines, and enables the orchestration of web services. Common data warehousing scenarios, such as the above mentioned extract, transform and load (ETL) scenario, are not well supported in BPEL-based processes, as the current BPEL language does not provide for a native definition of data integration processing elements.

A BPEL process is a flow of activities, where BPEL branching semantics indicate sequenced or parallel execution of the activities, including handling errors in activity executions. A BPEL process can have variables, which are used as either input or output parameters in the context of an activity's invocation. Several BPEL flow level and activity level attributes can exist. For example, groups of activities can be part of the same transaction. Other attributes include settings, such as whether transactional processing is managed by a BPEL engine, or whether individual activities manage their own transactions.

In contrast to BPEL processes, whose focus is the coordination of activities among service providers, data warehouse processes usually need to handle significant amounts of data. A data warehouse process includes a set of steps to extract, transform and load data, which are repeatedly performed depending on predefined control conditions. Data movement and transformation steps use database functionality and script files, as well as custom programs, to process the data. A data warehouse process can be scheduled (or triggered), and there is usually only a single instance of a data warehouse process running at any specific time. Error recovery in transformational processing is critical and is done using the transactional processing capability of SQL engines, or by running specific cleanup flows to "undo" partial processing.

Having a service-oriented approach, based on standards such as BPEL, is essential for enterprise component and process integration, especially when multiple parties are involved. With a service-oriented approach the distinctions between control processes (that is, BPEL processes) and data (that is, warehouse transformation) processes becomes less clear, especially from an end user's or administrator's perspective. Importantly, all the constituent activities, including the data transformation activities, must participate in a unified transactional context as well, to enable proper error recovery and restarts of failed processes, and so on. However, BPEL provides little support for data transformation activities. Hence, it would be advantageous to have a seamless integration of process steps and data integration steps to enable a combination of activities as flexibly as needed, while avoiding having to rely on multiple technology solutions for solving similar problems.

One solution for integrating a data flow into a BPEL-based process is to expose a data flow job through a web service. This approach, however, requires a separate web service interface for each data flow job, leading to a proliferation of web services in complex ETL scenarios and thus to extensive administration requirements. Furthermore, from an invocation point of view, web services are remote, which adds overhead for invocations of data transformations that have the potential of being handled locally.

Another possible solution is based on extensions to the BPEL-standard to support various high-level programming languages. For example, BPEL4Java systems enable BPEL process developers to embed Java™ code into BPEL, such as Java™ conditional expressions for evaluating branches or for invoking Java™ methods. However, these generic programming related solutions do not pertain to typical data transformation scenarios, especially since ETL jobs are usually executed on runtime (remote) systems.

Often, data transformations are performed using SQL. Thus, yet another possible solution for including data integration processing into a process is to make use of a native SQL-extension approach in the BPEL language. This solution has the advantage of integrating the data directly into the process, but also implies that already existing data transformation flows would need to be re-implemented as SQL embedded inside BPEL. There is also a dependency on a particular runtime environment as the BPEL engine must support this non-standard extension, and the data processing activities are limited to SQL. In typical situations, external programs and other non-SQL mechanisms are extensively used to complete even the most trivial of data warehouse processing. Also, the "dialect" of SQL used varies between different vendors, which makes it difficult to provide a standardized and useful extension to BPEL.

SUMMARY

In general, in one aspect, the invention provides methods and apparatus, including computer program products, implementing and using techniques for integrating control activities and data transformation activities in a process flow. A data transformation activity is invoked through local invocation. The data transformation activity is part of a process flow defined in a standard business process execution language format and is invoked from within the process flow.

Advantageous implementations can include one or more of the following features. The local invocation can be done by calling a service for local invocation in a data transformation processing subsystem. One or more data transformation activities can be defined as part of the process flow. One or more process-scoped variables can be generated to exchange information between a data transformation system and a process control engine that executes the process flow. A template partner link definition can be provided as part of the process flow to invoke a remote data transformation system. The template partner link definition can be used as a placeholder partner link when the remote data transformation system has not been identified at design time of the process flow. The template partner link definition can be used as a map to predefined partner links when the remote data transformation system has been identified at design time of the process flow.

An abstraction layer can be provided as part of the process flow. The abstraction layer can include a control flow level and a dataflow level. The dataflow level can contain specifics about data transformations. The control flow level can contain specifics about dependencies and an execution sequence of the dataflow. The control flow level can include one or more transactional and error recovery options. The process flow can be deployed into a system comprising a process control engine for executing the process flow and one or more data transformation systems for performing the data transformations. The process control engine can be a business process execution language engine. The data transformation activities can include one or more of: an extract, transform and load activity and a data movement that is a precursor to an extract, transform and load activity. A data transformation activity can be invoked through remote invocation, when the data transformation activity is to be performed on a remote system. The invocation can be done by calling a service for remote invocation in a data transformation processing subsystem. Each dataflow activity and each control activity can have a unique identifier.

In general, in another aspect, the invention provides a system for executing a process flow including one or more control activities and one or more data transformation activities. The system includes a process control engine, a data transformation subsystem and a control data repository. The process control engine executes activities included in the process flow. The data transformation subsystem stores domain specific definitions of data transformation processes of data in one or more databases. The control data repository stores domain specific activity information relating to the process flow.

Advantageous implementations can include one or more of the following features. The control data repository can store one or more of: runtime data for the process flow, auditing information for the process flow, and statistics generated from the execution of the activities in the process flow. The process control engine can include a business process execution language interface and a web services description language interface for communicating with other system components. The data transformation subsystem can be invoked as a local service or a remote service. The system can generate one or more process-scoped variables operable to exchange data between the process control engine and the data transformation subsystem. The process control engine can be a business process execution language engine and the process flow is described in a business process execution language. The process flow can include a template partner link definition to be used as a placeholder partner link when the remote data transformation system has not been identified at design time of the process flow, and to be used as a map to predefined partner links when the remote data transformation system has been identified at design time of the process flow.

The invention can be implemented to include one or more of the following advantages. The various embodiments of the invention enable a simplified integration of ETL or data integration activities in a process flow. The various embodiments of the invention provide a user with an option of doing either remote partner links or local method calls, with the complexity hidden from the user, as opposed to the default BPEL way of using partner links only.

The details of one or more embodiments of the invention are set forth in the accompanying drawings and the description below. Other features and advantages of the invention will be apparent from the description and drawings, and from the claims.

DESCRIPTION OF DRAWINGS

FIG. 6 shows an exemplary definition of a WSDL interface in accordance with one embodiment of the invention.

FIG. 7 shows an exemplary client definition in the WSDL interface in accordance with one embodiment of the invention.

FIG. 8 shows an exemplary BPEL4ETL activity definition based on BPEL4Java (or BPEL-J extension) in accordance with one embodiment of the invention.

FIG. 9 shows an exemplary definition of variables in accordance with one embodiment of the invention.

FIG. 10 shows an exemplary excerpt for the execution metadata of a dataflow activity in accordance with one embodiment of the invention.

Like reference symbols in the various drawings indicate like elements.

DETAILED DESCRIPTION

Overview

Figure 1:
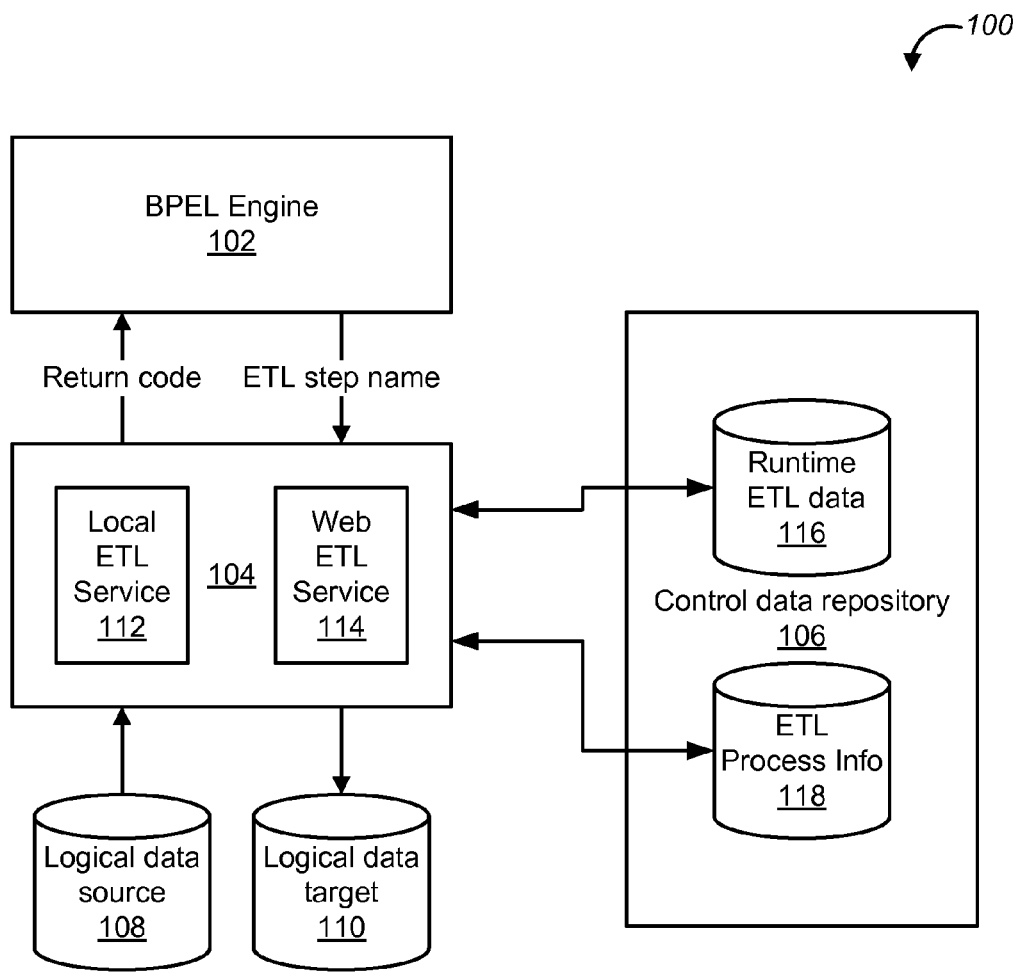
FIG. 1 shows a schematic view of a system (100) in accordance with one embodiment of the invention.

The various embodiments of the invention provide simplified integration of control and data activities in a process flow, by extending the BPEL language to represent a combination of processing nodes and data transformation activities. A simplified definition of data transformation activities is provided as part of a BPEL-based process. BPEL-process scoped variables are automatically generated in order to exchange status information between an ETL system and a BPEL choreography engine. A template partner link definition is provided for remote ETL web service invocations. The template partner link definition is used as a placeholder partner link (for example, to a specific hostname or IP address) when the service distribution is not known at design time. The user can later map this placeholder to the actual system that will be used. This feature also allows the user to easily switch between different systems, for example, from a test system to a live or production system. Alternatively, the template partner link definition can be used to map predefined partner links when the service distribution is known at design time. Finally, an option for local (that is, same system) execution is provided in order to avoid web services administration overhead. For example, one option for local execution is to use a direct Java method call instead of using partner links, which avoids the communication overhead that is necessary for partner links (and web services in general). The interaction between these different components will now be described in greater detail by way of example in the context of an exemplary BPEL for ETL system (BPEL4ETL), which is schematically shown in FIG. 1.

The BPEL4ETL System

The BPEL4ETL system (100) is an extended BPEL framework that enables user to intermix typical data warehousing processing, such as ETL jobs, as needed with other more process-control oriented activities in a BPEL process flow. The BPEL4ETL system (100) includes a BPEL engine (102), an extension ETL processing subsystem (104), a control data repository (106), a logical data source (108), and a logical data target (110). The BPEL engine (102) processes a BPEL4ETL file, which contains ETL activity definitions for a particular process, and as a result of the processing triggers the execution of these activities. The BPEL engine (102) has a WSDL interface and a BPEL interface through which the BPEL engine (102) can communicate with other remote components in the BPEL4ETL system (100).

It should be noted that although only one logical data source (108) and one logical data target (110) is shown in FIG. 1 for simplified understanding of the system (100), there can be multiple logical data sources (108) and/or multiple logical data targets (110). The logical data sources (108) and logical data targets (110), respectively, are typically databases, but can also be various types of files. For example, one activity in a flow can export data from a transactional database into a file; another activity in the same flow can use FTP (File Transfer Protocol) to transfer the file to another system; and yet another activity in the flow can load the file into a target database. The attribute "logical" is used herein to indicate that the data source (108) and the data target (110) do not have to be separate physical objects, but can be located for example on the same set of hardware equipment.

The extension ETL processing subsystem (104) can be invoked either locally as a local ETL service (112) or remotely as a web ETL service (114) and contains a domain-specific definition of common data warehousing processes involving the logical data source (108) and the logical data target (110). In some embodiments this domain-specific definition is provided as a two-level abstraction layer on top of the standard BPEL definition. The first level of the abstraction layer is the data flow level, which specifies the details of the data transformation or ETL. This is typically modeled using very specific techniques, which are known to those of ordinary skill in the art. The second level of the abstraction layer is the control flow level, which specifies the dependencies and the execution sequence of the data flows and activity nodes. The control flow level also includes transactional and other error recovery options applicable to such ETL activities, which are well-known to those of ordinary skill in the art. The extension ETL processing subsystem (104) communicates with remote components in the BPEL4ETL system (100) through a WSDL interface.

The control data repository (106) stores ETL domain specific activity information, such as ETL process information (118), and in some embodiments runtime ETL data (116), such as auditing information and statistics from activity executions, so that this information can be obtained and evaluated at a later time, if need be. As will be described in further detail below, in some embodiments of the BPEL4ETL system (100), each instance of an extended BPEL process is associated with a unique identifier. Furthermore, each activity referenced in a BPEL process is also associated with an identifier that is unique to the activity in the specific BPEL process instance. It should, however, be realized that in other embodiments it is possible to use completely unique identifiers, both for the process instances and data activity instances.

The BPEL4ETL Process Definition

As was described above, a BPEL flow instance can have many attribute values as well as variable definitions in addition to the references to the different activities, which together describe the execution semantics. For the BPEL4ETL system (100), additional information is required, and hence a specific data structure, herein referred to as a "BPEL4ETL process definition" is provided in accordance with various embodiments of the invention. The BPEL4ETL process definition includes:

References to all ETL activities, both local and remote, with each activity including domain specific attribute values. In some embodiments, local ETL activities are represented as Java™ activities in systems that support the BPEL-J extension proposal contributed by IBM and BEA. These activities use their unique activity identifiers together with the process identifier as arguments for the Java™ method call invoking the local ETL service (112) of the extension ETL processing subsystem (104). In some embodiments, remote ETL activities are represented through a set of assign and invoke activities. The remote ETL activities use their unique identifiers as message parameters for communicating with the web ETL service (114) of the extension ETL processing subsystem (104).

Automatically generated process-scoped variables. A process-scoped variable is generated for each ETL activity in order to hold and enable sharing of the state of each activity.

References to specific dataflow execution metadata for each dataflow activity. For example, there can be a reference to logging and statistic levels, as well as a reference to a specific dataflow job identifier to be invoked.

A partner definition for each remote ETL service host.

Global process-scoped variables, which hold pre-defined message definitions for the remote web ETL service (114).

This BPEL4ETL process definition is included in the interface definitions of the different components of the BPEL4ETL system (100). In some embodiments the BPEL4ETL process definition is included in the WSDL interface definition, the WSDL client interface, and the BPEL file. The WSDL interface definition contains the entry and exit points and the message definitions for the BPEL process. The WSDL client interface is used to identify the ETL services provided on remote ETL systems that are used as partners. The BPEL file contains the flow and activity definitions and uses the message and partner descriptions exposed through the WSDL files. Having described the BPEL4ETL system (100) and the BPEL4ETL process definition, it will now be explained how a user can add ETL activities to BPEL flows.

Adding ETL Activities to BPEL Flows

As is well known to those of ordinary skill in the art, there exists a variety of graphical user interface (GUI) editors for BPEL, such as the WebSphere Integration Developer provided by IBM Inc. of Armonk, N.Y., the BPEL Process Manager provided by Oracle Inc. of Redwood Shores, Calif., and various types of open source BPEL editors. In various embodiments, these GUI editors can be extended to include functionality for adding ETL activities to BPEL flows, so that a user can select specific ETL activity types and create instances of them to be added to a currently selected BPEL instance. Alternatively, completely new GUI editors can be created that include editing functionality for BPEL4ETL processes. The specific editing mechanisms that are used by such editors are well known to those of ordinary skill in the art and are beyond the scope of this application.

Figure 2:
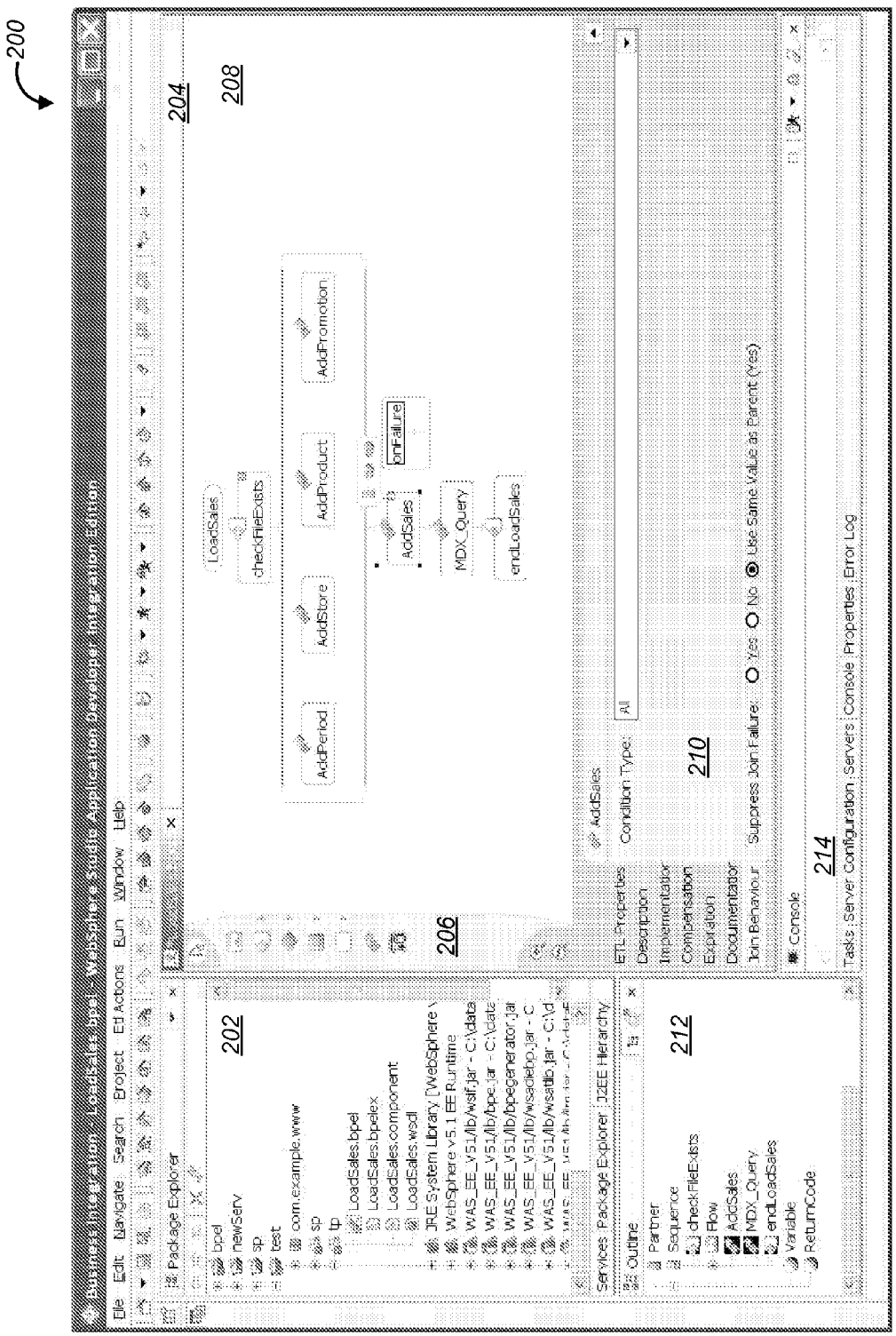
FIG. 2 shows an exemplary GUI editor for editing a BPEL4ETL process in accordance with one embodiment of the invention.

FIG. 2 shows a screenshot (200) of an exemplary GUI editor for editing a BPEL4ETL process in accordance with one embodiment of the invention. As can be seen in FIG. 2, the screen (200) is divided in four areas. The first area is an explorer (202) that is used to select the files to work with. The second area is a main editor (204) that has a widget palette (206), a canvas (208), and a properties view (210). The third area is an outline view (212) that shows a list of objects used on the current canvas (208). The fourth area is a console view (214) for standard input and output queues. The flow is constructed by picking up a widget from the palette (206), dropping it on the canvas (208) and setting the appropriate properties (210). The sample flow shown in FIG. 2 first checks a file for existence and, if successful, invokes four activities in parallel, to add dimension data for periods, stores, products and promotions. When all four activities are finished, sales fact data is loaded and after that a data update is initiated to optimize data for MDX queries.

Figure 3:
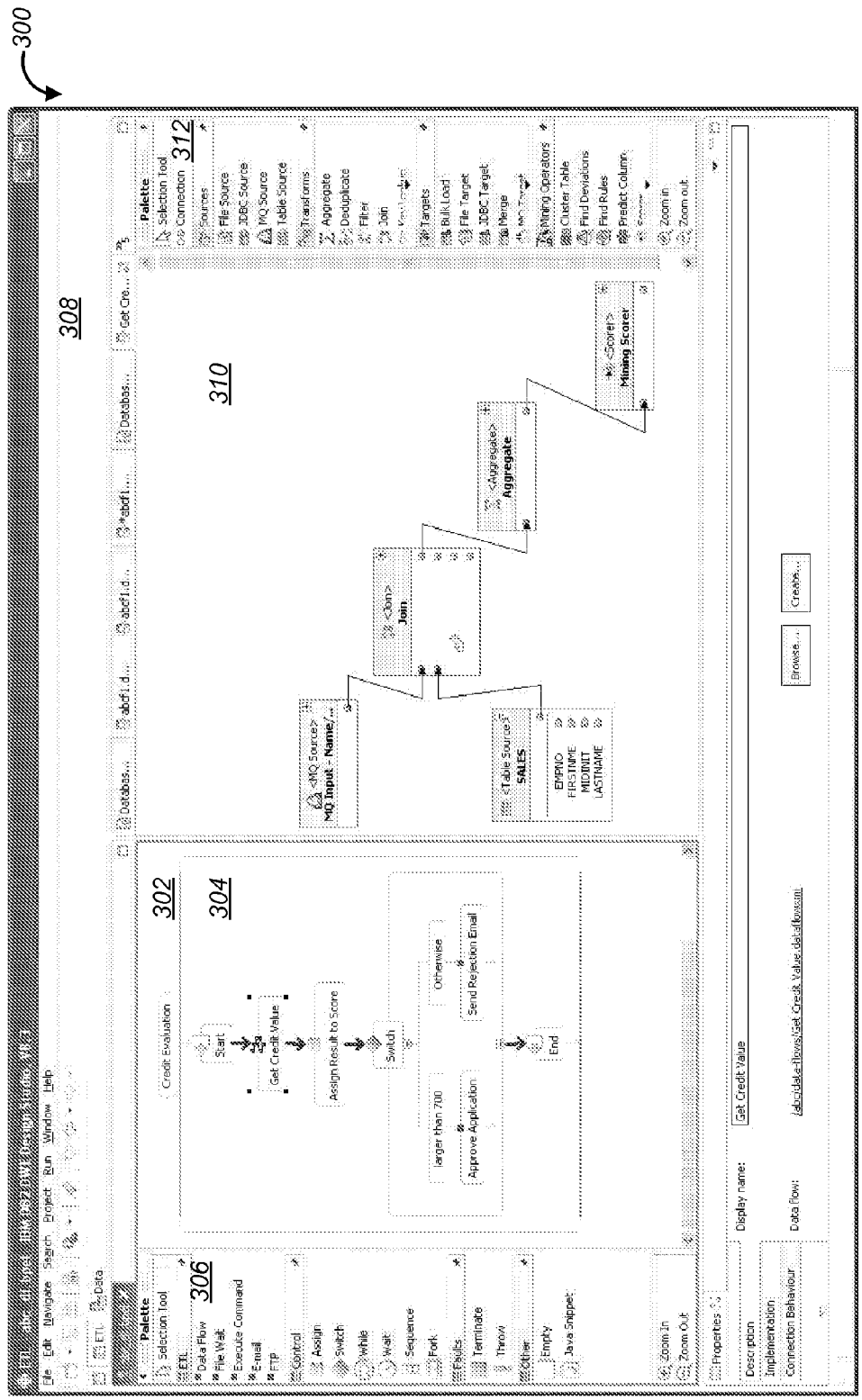
FIG. 3 shows an exemplary GUI editor for editing a BPEL control flow and a dataflow in accordance with one embodiment of the invention.

FIG. 3 shows a screenshot (300) of an exemplary GUI editor for editing a BPEL control flow and a dataflow in accordance with one embodiment of the invention. As can be seen in FIG. 3, the screenshot (300) shows a split screen having a left half (302) showing a control flow editor canvas (304) with an associated palette (306). The right half of the screen (308) shows a dataflow editor canvas (310) with an associated palette (312). The first activity 'Get Credit Value' references the dataflow shown in the right half (308) of the screen. The flow continues with a decision point for an approval or rejection action. The dataflow specifies the data sources, joins and aggregates the data, and applies a mining scorer to calculate the credit value.

Figure 4:
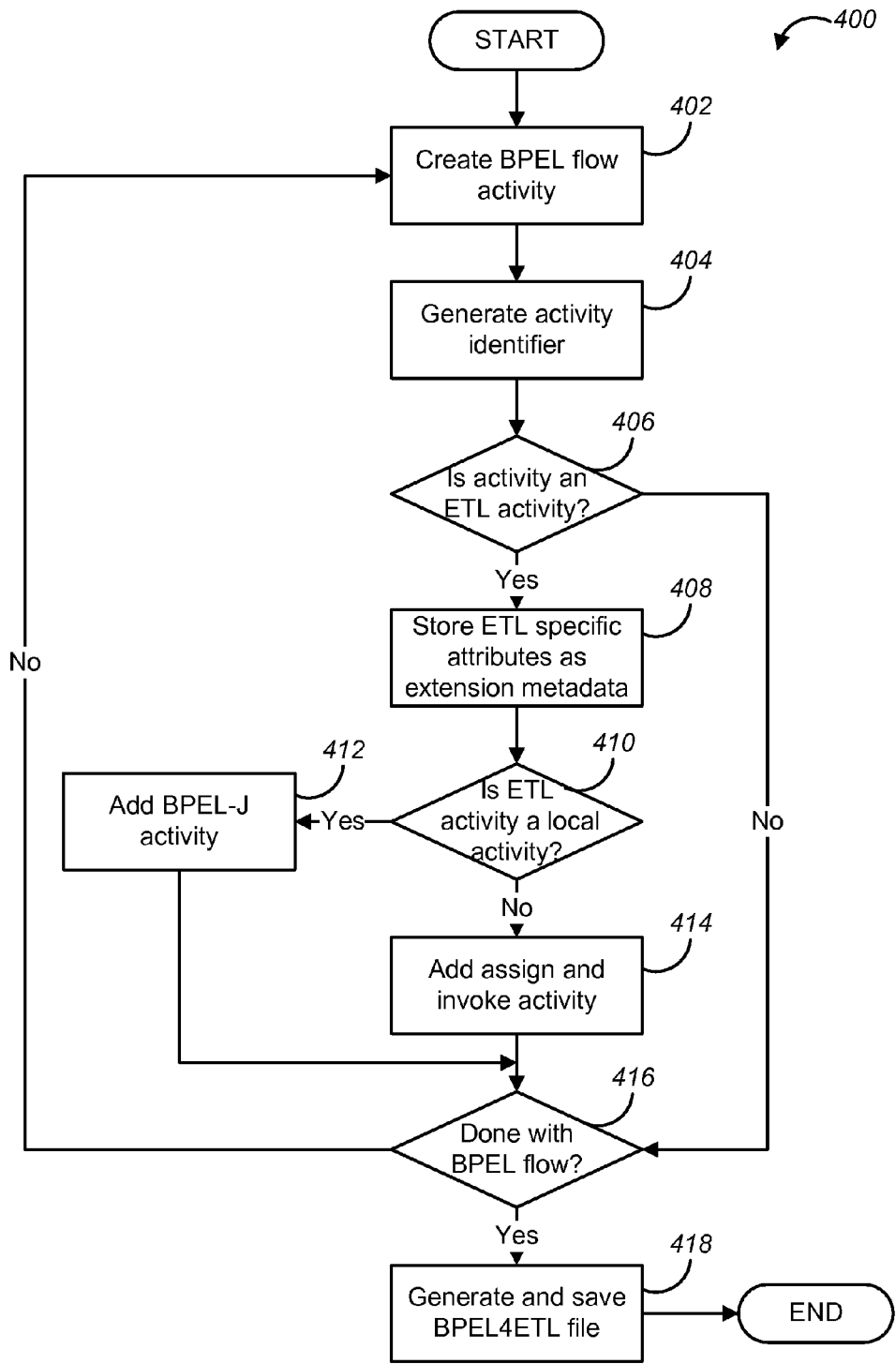
FIG. 4 is a schematic flowchart showing a process for designing a BPEL process that includes ETL activities in accordance with one embodiment of the invention.

FIG. 4 is a schematic flowchart showing a process (400) for designing a BPEL process, that is, a sequence of BPEL activities, which includes ETL activities in accordance with one embodiment of the invention. As can be seen in FIG. 4, the process starts by creating a BPEL flow activity (step 402), for example, using one of the GUI editors shown in FIGS. 2 and 3. When the activity is created, the process automatically generates an identifier that uniquely identifies the activity (step 404). The process then examines whether the newly generated activity is an ETL activity (step 406). If the activity is not an ETL activity, continues to step 416, which will be described below.

If it is determined in step 406 that the activity is an ETL activity, then the process stores the ETL specific attributes, including the auto-generated activity identifier from step 404, as extension metadata to the BPEL information, and creates a state variable for the activity (step 408). Next, the process examines whether the ETL activity is a local activity (step 410). If the ETL activity is a local activity, the process adds a BPEL-J Java™ activity, specifying the ETL extension system's entry-point Java™ method, in order to indicate a local invocation (step 412). If the ETL activity is not a local activity, that is, the ETL activity is a remote activity, an assign activity and an invoke activity are placed in the BPEL sequence, which represent the remote activity (step 414).

After completing step 412 or step 414, respectively, the process checks whether the entire BPEL process is complete (step 416). If the BPEL process is not complete, the process returns to step 402, where the next BPEL flow activity is created, and then continues as described above. If it is determined in step 416 that the BPEL process is complete, a BPEL4ETL file is generated and saved for later execution (step 418), which completes the process (400).

It should be noted that in some embodiments, users can add extension metadata to activities in the BPEL process, either in the same BPEL file or in an external associated file. In other embodiments, extensions that do not conform to BPEL specifications can be stored as XML or Java™ comments (in the case of BPEL-J systems) in the BPEL file. For BPEL4ETL processes, these comments are pre-processed during deployment by the ETL specific extension pre-processor, which extracts the comments and makes them available in the ETL control data repository (106). This makes it possible to exchange the content of an activity without the need to redeploy the BPEL process itself.

Executing a BPEL Process Including ETL Activities

Figure 5:
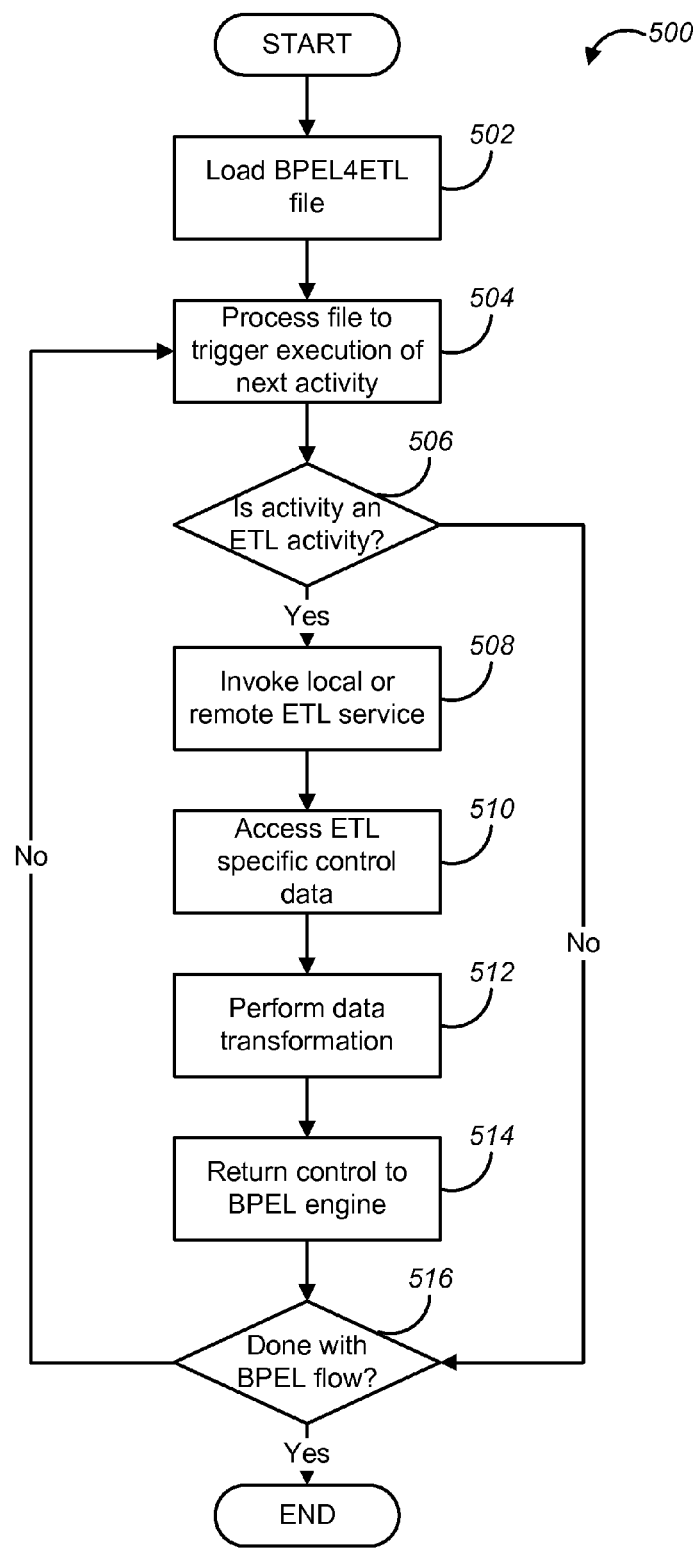
FIG. 5 is a schematic flowchart showing a process for running an instance of a BPEL process that includes ETL activities in accordance with one embodiment of the invention.

FIG. 5 shows a schematic flowchart of a process (500) for running an instance of a BPEL4ETL process in accordance with one embodiment of the invention. It is assumed that any necessary pre-processing of the BPEL4ETL file has already been done, as described in the previous paragraph, so that the ETL metadata is available for use in the control data repository (106). As can be seen in FIG. 5, the process starts by loading the BPEL4ETL file (step 502) into the BPEL engine (102). The BPEL engine (102) processes the BPEL4ETL file to execute the first activity of the BPEL4ETL file (step 504). In executing the activity, the BPEL engine (102) checks whether the activity is an ETL activity (step 506).

If the activity is an ETL activity, then the BPEL engine (102) triggers the execution of the ETL activity through invocation of either the local ETL service (112) or the remote web ETL service (114) (step 508). The invoked ETL service accesses ETL specific control data from the control data repository (106) (step 510) and performs the requested data transformation (512) based on the control data. Next, the process returns the control to the BPEL engine (102) (step 514). The BPEL engine (102) checks whether all the activities in the BPEL4ETL file have been processed (step 516). If there are still more activities to be processed, the process continues to step 504 where the next activity is executed, as described above. If it is determined in step 516 that there are no more activities to be processed, the process (500) ends.

Example BPEL4ETL

FIG. 6 shows an exemplary definition of a WSDL interface in accordance with one embodiment of the invention. FIG. 6 shows an exemplary definition of a WSDL interface based on the WSDL specification (available at http://www.w3.org/TR/wsdl) in accordance with one embodiment of the invention. The WSDL interface contains the message structures which are used to communicate between the caller and the server for the exposed operations. For example, the result status of an ETL activity is exchanged with the message referenced as 'disResponse', which contains four attributes with a type as defined.

FIG. 7 shows an exemplary client definition in the WSDL interface in accordance with one embodiment of the invention. FIG. 7 shows an exemplary client definition as WSDL port types based on the partner link type specification of the BPEL specification (ftp://www6.software.ibm.com/software/developer/library/ws-bpel1.pdf). The client definition describes the roles of a particular service in a conversation between processes.

FIG. 8 shows an exemplary BPEL4ETL activity definition based on BPEL4Java (BPEL-J) in accordance with one embodiment of the invention. The example illustrates the mechanisms used to integrate the ETL task as a Java activity into a BPEL flow, in particular the invocation of ETL specific execution and the use of the activity-specific global variable for status checks and subsequent error handling.

FIG. 9 shows an exemplary definition of variables in accordance with one embodiment of the invention. For each ETL activity a global variable is added following the BPEL specification: each variable is uniquely named and refers to the message structure that describes the attributes which are stored in the variable.

FIG. 10 shows an exemplary excerpt for the execution metadata of a dataflow activity in accordance with one embodiment of the invention. FIG. 10 illustrates a particular code unit type which can be used in a dataflow and contains the attributes needed to control the execution of, in this case, a file reader unit. The attributes are provided in an argument table and can contain a fixed value, as shown in the example, or a placeholder which is substituted during execution time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and so on.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

A number of implementations of the invention have been described. Nevertheless, it will be understood that various modifications may be made without departing from the spirit and scope of the invention. Accordingly, other embodiments are within the scope of the following claims.

The invention claimed is:

1. A computer program product for integrating control activities and extract, transform and load activities in a process flow for a data warehouse, the computer program product comprising a computer readable storage medium having program instructions embodied therewith, wherein the computer readable storage medium is not a transitory signal per se, wherein the program instructions are executable on a computer to cause the computer to perform a method comprising:
   deploying a process definition file into a system comprising a process control engine for executing a process flow described in the process definition file, and one or more data transformation systems for performing the extract, transform and load activities, wherein the process definition file includes:
      references to local and remote extract, transform and load activities, wherein each activity includes domain specific attribute values,
      automatically generated process-scoped variables for each extract, transform and load activity, wherein the process-scoped variables hold and enable sharing of the state of each extract, transform and load activity,
      references to specific dataflow execution metadata for dataflow activities included in the process flow,
      a partner definition for each remote extract, transform and load service host, and
      global process-scoped variables for holding pre-defined message definitions for the remote extract, transform and load services;
   processing the process definition file, by the process control engine, to execute an activity described in the process definition file;
   in executing the activity, determining, by the process control engine, whether the extract, transform and load activity is a local activity; and
   in response to determining that the extract, transform and load activity is a local activity, invoking, by the process control engine, the extract, transform and load activity on data residing in a data warehouse through local invocation, by performing a method call to a service for local invocation in a data transformation processing subsystem.

2. The computer program product of claim 1, wherein the computer readable program when executed on a computer further causes the computer to:
   define one or more extract, transform and load activities as part of the process definition file.

3. The computer program product of claim 1, wherein the computer readable program when executed on a computer further causes the computer to:
   include a template partner link definition in the process definition file, the template partner link being operable to invoke a remote data transformation system.

4. The computer program product of claim 3, wherein the template partner link definition is operable to be used as a placeholder partner link when the remote data transformation system has not been identified at design time of the process flow described in the process definition file.

5. The computer program product of claim 3, wherein the template partner link definition is operable to be used as a map to predefined partner links when the remote data transformation system has been identified at design time of the process flow described in the process definition file.

6. The computer program product of claim 1, wherein the computer readable program when executed on a computer further causes the computer to:
provide an abstraction layer as part of the process definition file.

7. The computer program product of claim 6, wherein the abstraction layer includes a control flow level and a dataflow level.

8. The computer program product of claim 7, wherein the dataflow level contains specifics about extract, transform and load activities.

9. The computer program product of claim 7, wherein the control flow level contains specifics about dependencies and an execution sequence of the dataflow.

10. The computer program product of claim 7, wherein the control flow level includes one or more transactional and error recovery options.

11. The computer program product of claim 1, wherein the process control engine is a business process execution language engine.

12. The computer program product of claim 1, wherein the computer readable program when executed on a computer further causes the computer to invoke a data movement that is a precursor to an extract, transform and load activity.

13. The computer program product of claim 1, wherein the computer readable program when executed on a computer further causes the computer to:
invoke an extract, transform and load activity through remote invocation, in response to determining that the extract, transform and load activity is a remote activity.

14. The computer program product of claim 13, wherein the invocation is done by calling a service for remote invocation in the data transformation processing subsystem.

15. The computer program product of claim 1, wherein each dataflow activity and each control activity has a unique identifier.

16. A system for executing a process flow including one or more control activities and one or more extract, transform and load activities for a data warehouse, the system comprising:
a process control engine operable to execute activities included in the process flow, wherein the process flow is described in a process definition file, wherein the process definition file includes:
references to local and remote extract, transform and load activities, wherein each activity includes domain specific attribute values,
automatically generated process-scoped variables for each extract, transform and load activity, wherein the process-scoped variables hold and enable sharing of the state of each extract, transform and load activity,
references to specific dataflow execution metadata for dataflow activities included in the process flow,
a partner definition for each remote extract, transform and load service host, and
global process-scoped variables for holding pre-defined message definitions for the remote extract, transform and load services;
a data transformation subsystem operable to store domain specific definitions of extract, transform and load activities of data residing in one or more databases in a data warehouse, the data transformation subsystem further being operable to be invoked as one of: a local service and a remote service; and
a control data repository operable to store domain specific activity information related to the process flow.

17. The system of claim 16, wherein the control data repository stores one or more of: runtime data for the process flow, auditing information for the process flow, and statistics generated from the execution of the activities in the process flow.

18. The system of claim 16, wherein the process control engine further includes a business process execution language interface and a web services description language interface for communicating with other system components, wherein the business process execution language interface and the web services description language interface include the data from the process definition file.

19. The system of claim 16, wherein the data transformation subsystem is operable to store domain specific information as a two-level abstraction layer on top of a standard business prosecution execution language definition.

20. The system of claim 19, wherein the abstraction layer includes a control flow level and a dataflow level.

21. The system of claim 20, wherein the dataflow level contains specifics about data transformations.

22. The system of claim 20, wherein the control flow level contains specifics about dependencies and an execution sequence of the dataflow.

23. The system of claim 16, wherein the system is operable to generate one or more process-scoped variables operable to exchange data between the process control engine and the data transformation subsystem.

24. The system of claim 16, wherein the process control engine is a business process execution language engine and the process flow is described in a business process execution language.

25. The system of claim 16, wherein the data transformation subsystem is further operable to store domain specific definitions of data movements that are precursors to extract, transform and load activities.

26. The system of claim 16, wherein the process definition file includes a template partner link definition operable to be used as a placeholder partner link when the remote data transformation system has not been identified at design time of the process flow, and to be used as a map to predefined partner links when the remote data transformation system has been identified at design time of the process flow.

27. A computer-implemented method for integrating control activities and extract, transform and load activities in a process flow for a data warehouse, the method comprising:
deploying a process definition file into a system comprising a process control engine for executing a process flow described in the process definition file, and one or more data transformation systems for performing the extract, transform and load activities, wherein the process definition file includes:
references to local and remote extract, transform and load activities, wherein each activity includes domain specific attribute values,
automatically generated process-scoped variables for each extract, transform and load activity, wherein the process-scoped variables hold and enable sharing of the state of each extract, transform and load activity,
references to specific dataflow execution metadata for dataflow activities included in the process flow,
a partner definition for each remote extract, transform and load service host, and
global process-scoped variables for holding pre-defined message definitions for the remote extract, transform and load services;

processing the process definition file, by the process control engine, to execute an activity described in the process definition file;

in executing the activity, determining, by the process control engine, whether the extract, transform and load activity is a local activity; and in response to determining that the extract, transform and load activity is a local activity, invoking, by the process control engine, the extract, transform and load activity on data residing in a data warehouse through local invocation, by performing a method call to a service for local invocation in a data transformation processing subsystem.

28. The method of claim 27, further comprising:

provide an abstraction layer as part of the process definition file, the abstraction layer including a control flow level containing specifics about dependencies and an execution sequence of the dataflow, and a dataflow level containing specifics about extract, transform and load activities.

29. The method of claim 27, further comprising:

invoking a data movement that is a precursor to an extract, transform and load activity.

30. The method of claim 27, further comprising:

invoking an extract, transform and load activity through remote invocation, in response to determining that the extract, transform and load activity is a remote activity.

* * * * *